United States Patent [19]

Barber, Jr. et al.

[11] 4,098,259
[45] Jul. 4, 1978

[54] SOLAR ENERGY COLLECTION SYSTEM

[75] Inventors: Everett M. Barber, Jr., Guilford; Thomas P. Hopper, Durham, both of Conn.

[73] Assignee: Sunworks, Inc., Guilford, Conn.

[21] Appl. No.: 703,975

[22] Filed: Jul. 9, 1976

[51] Int. Cl.² .................................................. F24J 3/00
[52] U.S. Cl. .................................... 126/270; 126/271
[58] Field of Search ............... 126/270, 271; 237/1 A; 60/641; 248/56, 57; 138/103, 106, 109; 174/61–64, 38; 285/192, 224; 137/359, 360

[56] References Cited

U.S. PATENT DOCUMENTS

| 2,404,539 | 7/1946 | Schmidt | 285/192 X |
| 3,809,350 | 5/1974 | Lane | 248/57 |
| 3,851,673 | 12/1974 | Merkle et al. | 138/106 |
| 3,936,589 | 2/1976 | Teeters, Sr. et al. | 248/56 X |
| 3,974,822 | 8/1976 | Patil | 126/271 |
| 3,980,071 | 9/1976 | Barber, Jr. | 126/271 |
| 4,003,363 | 1/1977 | Grossman | 126/270 |

Primary Examiner—William F. O'Dea
Assistant Examiner—Larry Jones
Attorney, Agent, or Firm—DeLio and Montgomery

[57] ABSTRACT

A solar energy collecting system of the liquid type where conduits in individual collectors of a system are in contact with an absorbing panel and the conduits of each panel are connected between liquid external input and exit manifolds, and where provision is made to accommodate differential expansion and contraction between piping of individual collectors and manifolds and minimize heat losses where the collector headers exit the collectors and join the external manifolds.

4 Claims, 5 Drawing Figures

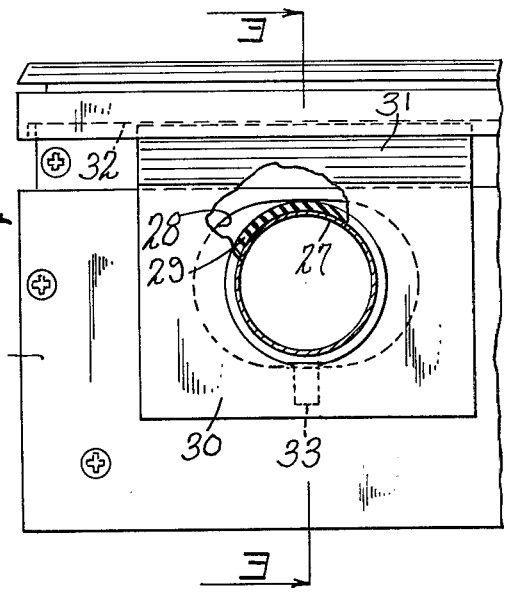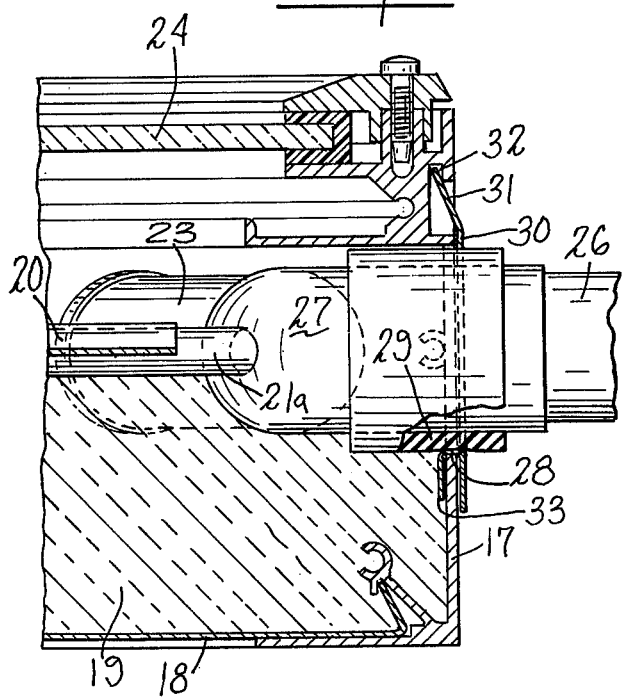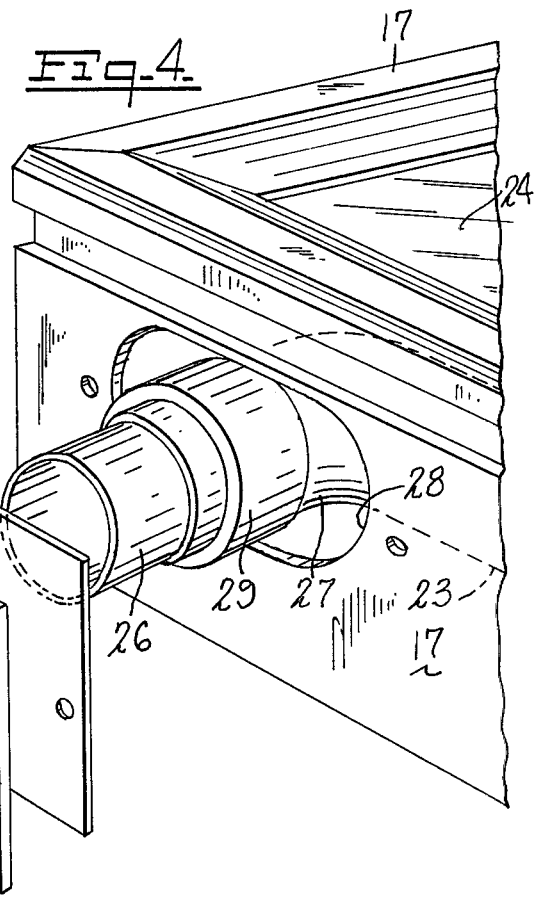

SOLAR ENERGY COLLECTION SYSTEM

This invention relates to solar energy collectors and more particularly relates to a system embodying several collectors with liquid conduits on an absorbing panel, where the conduits of each panel are connected to common input and return manifolds.

In solar energy collection systems of the type utilizing liquid as a heat exchange medium, the liquid exchange medium is generally passed through conduits which are in intimate heat transfer relation with a collector panel. A plurality of collectors are usually connected between external manifolds. An example such system is shown in co-pending application Ser. No. 453,353 filed Mar. 21, 1974, now U.S. Pat. No. 3,980071.

In such systems, the liquid heat exchange medium is pumped through one manifold to the plurality of collectors and returned to the heat storage tank through return manifolds. The various collectors are in separate housings and each is connected between the manifolds. Within each housing is a solar energy absorbing panel and a grid-like arrangement of piping comprising a plurality of conduits contacting the absorber panel and extending between headers. The headers of each collector are connected to the manifolds and such connection extends through the wall of the housing.

The temperature of the liquid in the system may vary considerably depending upon the incidence of solar energy on the panels and different rates of expansion of the piping will occur throughout the system. The manifolds will expand and contract; however, the rigid frame of each collector does not move at the same rate. Repeated expansion and contraction of the various parts of the piping system may lead to failure of the connection between the headers inside the collectors to the external manifolds.

Additionally, wherein flat or substantially flat plate panels are utilized as the main absorber of solar energy, care must be taken to minimize entrance of ambient air into the collector. Otherwise, there will be increased heat loss from the surface of the absorber due to convection currents within the collector between the absorber and the transparent cover member. It is not desirable to use a flexible coupling between the headers and the manifold since this type of coupling does not have long-term durability, nor is it able to withstand the combination of temperature and pressure to which it might be subjected.

Accordingly, the present invention provides a new and improved connection system for the conduits of individual collectors to external manifolds while preventing loss of thermal efficiency of the collector due to leakage of ambient air therein and convection currents over the absorber surface.

Briefly stated, the invention in one form thereof comprises a collector housing having side or end walls in which an elongated slot is defined to permit lateral movement of the end of a header extending therethrough to a manifold. The coupling of the manifold to the headers is permanent and rigid. A closure member of flexible material having an aperture therein for receiving the end of the header is mounted to the collector side wall and closes such elongated opening while permitting relative movement of the header connection therein.

An object of this invention is to provide a new and improved solar energy collection system of the type described which accommodates contraction and expansion of the relative parts thereof due to temperature variation.

The features of the invention which are believed to be novel are particularly pointed out and distinctly claimed in the concluding portion of this specification. The invention, however, both as to its operation and organization together with further objects and advantages thereof may best be appreciated by reference to the following detailed description taken in conjunction with the drawings wherein:

FIG. 2 is a view seen in the plane of lines 2—2 of FIG. 1;

FIG. 3 is a view seen in the plane of lines 3—3 of FIG. 2; and

FIG. 4 is a view in perspective of another embodiment of the invention.

Figure 1:
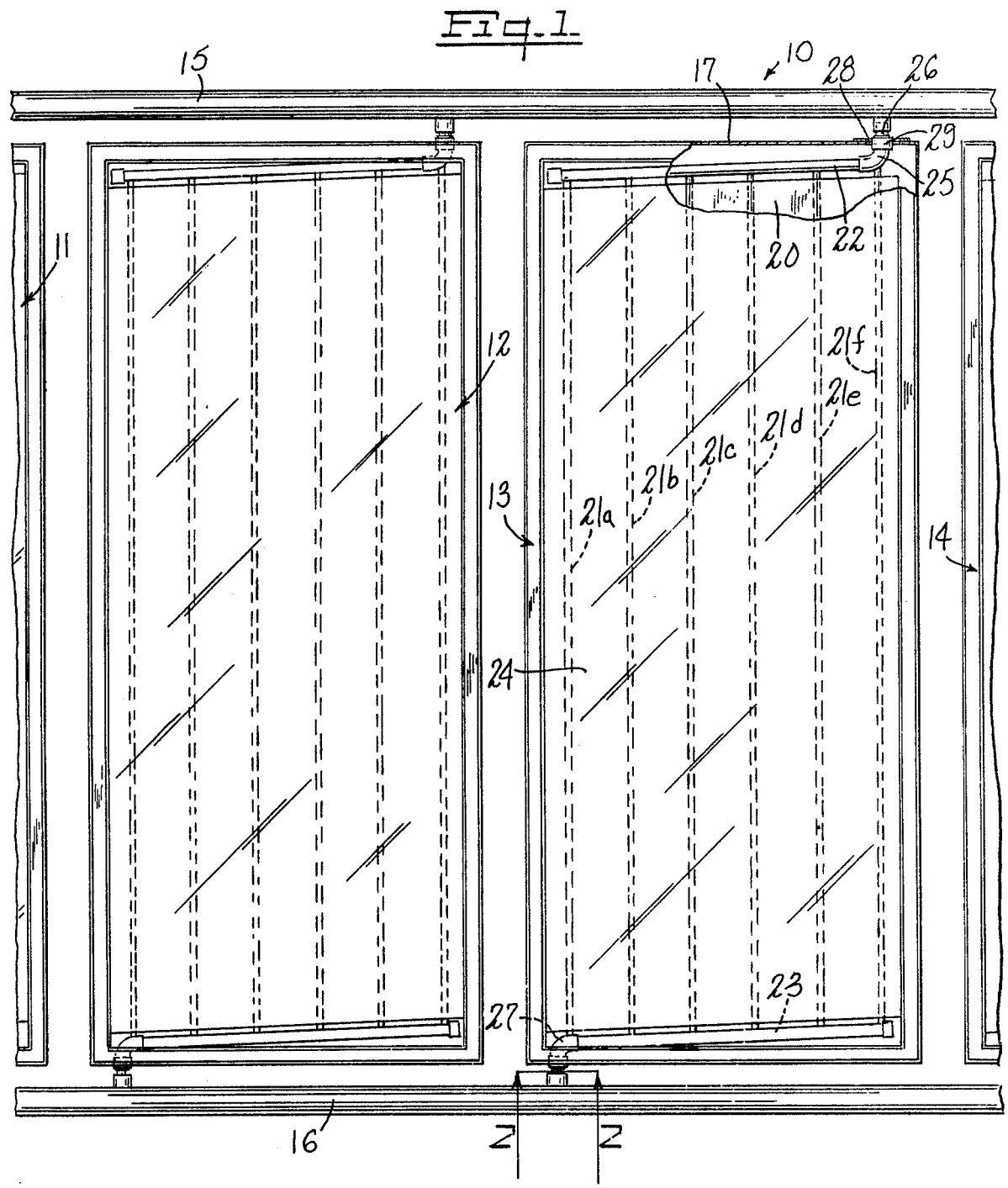
FIG. 1 is a top plan view of a portion of a solar energy collection system embodying the invention.

A system 10, as exemplified in FIG. 1, comprises a plurality of collectors 11, 12, 13 and 14 connected between external liquid carrying manifolds 15 and 16. Each of the collectors as shown in FIGS. 1 and 3 comprise side and end walls 17 defining a rectangular housing. Disposed in the housing on a bottom wall member 18 is a thickness of insulating material 19. Resting on the insulating material is an absorber panel 20. Disposed below absorber 20 and in intimate heat transfer relationship therewith are a plurality of conduits 21a – 21f, extending between headers 22 and 23. A transparent cover member 24 covers the housing and the housing is generally air-tight except for a few small moisture weep holes defined in the lower end thereof. All possible care is taken to minimize movement of air over the surface of panel 20. Such movement and any convection currents will remove heat from the absorber and decrease the efficiency of operation of the system.

The headers are closed at one end. Header 22 has manifold connection means on the other end thereof including an elbow 25 leading to a connection nipple 26 for manifold 15. Header 23 has an elbow 27 thereon and a connection nipple for the same purpose. Elbow 27, as exemplified in FIGS. 2 and 3, extends through an opening 28 in end wall 17 and has disposed thereabout a heat insulating sleeve 29 to guard against loss of heat to the frame. Opening 28 is elongated in the expected direction of movement nipple 26, and elbow 27. The opening may take any shape so long as it is sized to permit movement of the connection thereacross. A similar opening is provided for elbow 25 of header 22, but only one need be described.

To close opening 28 and yet permit lateral movement of the headers and elbows therein, a closure member 30 has an aperture defined therein whose edge receives the periphery of sleeve 29. Member 30 is of a lateral dimension to maintain opening 28 closed should elbow 27 move to either limit of the opening. Member 30 has a portion 31 which fits into a guide or track 32 defined on end wall 17, and further includes a lug 33 which extends through opening 28 and is bent down over the lower edge of opening 28. This provides a further retainer and guide for member 30 on the end wall. With this construction, as elbow 27 moves in opening 28, closure member 30 moves therewith and maintains opening 28 closed. Hence, entrance of cold air or escape of the warmer air and resultant cooling of absorber 20 is prevented.

An alternate embodiment of the invention is shown in FIG. 4 wherein a sheet 40 of flexible material such as neoprene or silicone, together with a rigid frame member 41, is fastened to wall 17 as by means of screws 42. The flexible sheet 40 is held in compression between frame 41 and wall 17 and the aperture 43 therein is stretched over and closely fits around sleeve 29 to give a substantially air-tight connection. There is sufficient resilience in sheet 40 to accept any lateral movement of elbow 27 in opening 28.

With these constructions, the connections 26 leading from the headers to the exterior manifold may be metallic and rigid for long-term durability, and yet will permit and accept the relative movement of the parts. Moreover, heat losses to the frame from the connection is minimized if not eliminated.

The absorber-conduit-header assembly is merely laid on the insulation 19 and is out of contact with the side walls 17 and, therefore, there is no positive restraint on the movement of the header elbows and the overall conduit assembly. The absorber, conduits, headers and manifold are preferably of copper but may be of other acceptable material. The housing frame is preferably of extruded aluminum section, but may be of other acceptable material.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A solar energy collector system of the type comprising a plurality of housing members having bottom walls and side walls and a transparent cover member, each having a heat absorbing member therein and heat exchange conduit means in heat transfer contact with said member, said conduit means including tubular members extending between spaced apart metallic headers, said headers adapted to be connected to spaced apart exterior metallic manifolds extending along a plurality of housing members, openings defined in side walls, tubular connection means extending through said openings from said headers to said manifolds, a non-metallic heat insulating sleeve disposed about each of said connection means and extending on either side of said openings to insulate said connection means from said housing, said openings being of greater dimension than said connection means, closure means disposed about and contacting said sleeve and closing said openings but permitting movement of said connection means in said opening, said closure means comprising a sheet of flexible non-metallic material, and means securing said sheet to said frame.

2. The system of claim 1 wherein said openings are elongated in the direction of the manifolds.

3. A solar energy collector system of the type comprising a plurality of housing members having bottom walls and side walls and a transparent cover member, each having a heat absorbing member therein and heat exchange conduit means in heat transfer contact with said member, said conduit means including tubular members extending between spaced apart metallic headers, said headers adapted to be connected to spaced apart exterior metallic manifolds extending along a plurality of housing members, openings defined in side walls, tubular connection means extending through said openings from said headers to said manifolds, a non-metallic heat insulating sleeve disposed about said connection means and extending on either side of said openings to insulate said connection means from said housing, said openings being of greater dimension than said connection, and a plate-like member disposed about said sleeve and covering said opening, said plate-like member being slidably mounted to said frame.

4. The system of claim 3 wherein said openings are elongated in the direction of the manifolds.

* * * * *